United States Patent
Farmanbar et al.

(10) Patent No.: US 10,129,894 B2
(45) Date of Patent: Nov. 13, 2018

(54) SYSTEMS AND METHODS FOR PERFORMING TRAFFIC ENGINEERING THROUGH NETWORK SLICES

(71) Applicants: Hamidreza Farmanbar, Ottawa (CA); Sophie Vrzic, Kanata (CA); Hang Zhang, Nepean (CA)

(72) Inventors: Hamidreza Farmanbar, Ottawa (CA); Sophie Vrzic, Kanata (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/061,570

(22) Filed: Mar. 4, 2016

(65) Prior Publication Data

US 2017/0257870 A1 Sep. 7, 2017

(51) Int. Cl.
| | |
|---|---|
| *H04W 4/00* | (2018.01) |
| *H04W 72/04* | (2009.01) |
| *H04W 24/08* | (2009.01) |
| *H04W 28/10* | (2009.01) |
| *H04W 40/04* | (2009.01) |

(52) U.S. Cl.
CPC ....... *H04W 72/0486* (2013.01); *H04W 24/08* (2013.01); *H04W 28/10* (2013.01); *H04W 40/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,515,873 B2* | 12/2016 | Anumala | .............. | H04L 41/08 |
| 2009/0201932 A1 | 8/2009 | Kumar et al. | | |
| 2014/0301192 A1* | 10/2014 | Lee | .............. | H04L 47/10 |
| | | | | 370/230 |
| 2015/0163147 A1* | 6/2015 | Li | .............. | H04L 47/18 |
| | | | | 370/236 |

(Continued)

FOREIGN PATENT DOCUMENTS

| | | | |
|---|---|---|---|
| CN | 101406023 A | | 4/2009 |
| CN | 101667956 A | | 3/2010 |

(Continued)

OTHER PUBLICATIONS

Zhang et al, Traffic Engineering for Software-Defined Radio Access Network, IEEE, 7 pages, 2014.*

(Continued)

*Primary Examiner* — Frank Duong

(57) ABSTRACT

Systems and methods for performing traffic engineering in a communications network using a plurality of network slices are disclosed. The network slices are configured to manage a service including transmission of data along one or more flows along nodes of the communications network using a portion of physical link resources of the communications network. The method includes allocating the portion of physical link resources of the communications network associated with a first network slice of the plurality of network slices in accordance with instructions received from a traffic engineering entity associated with the first network slice.

33 Claims, 12 Drawing Sheets

(56) References Cited

U.S. PATENT DOCUMENTS

| | | | | |
|---|---|---|---|---|
| 2015/0295761 A1* | 10/2015 | Wang | ............ | H04L 41/0806 |
| | | | | 709/222 |
| 2017/0054595 A1* | 2/2017 | Zhang | ............ | H04L 41/0803 |
| 2017/0093698 A1 | 3/2017 | Farmanbar | | |
| 2017/0164349 A1* | 6/2017 | Zhu | ............ | H04W 28/0247 |

FOREIGN PATENT DOCUMENTS

| | | |
|---|---|---|
| CN | 105245307 A | 1/2016 |
| WO | 2008028424 A1 | 3/2008 |
| WO | 2014205786 A1 | 12/2014 |
| WO | 2015142372 A1 | 9/2015 |

OTHER PUBLICATIONS

Akyildiz et al, Wireless software-defined networks (W-SDNs) and network function virtualization (NFV) for 5G cellular systems: An overview and qualitative evaluation, Elsevier, 14 pages, 2015.*
Hakiri et al, Software-defined Networking: Challenges and Research Opportunities for Future Internet, Elsevier, 26 pages, Oct. 2014.*
Rao et al, 5G Wireless Network: MyNET and SONAC, IEEE, 10 pages, Aug. 2015.*
English translation of Abstract for CN101667956.
English translation of Abstract for CN105245307.
English translation of WO2014205786.
International Search Report dated Nov. 4, 2016 for corresponding International Application No. PCT/CN2016/094413 filed Aug. 10, 2016.

* cited by examiner

SYSTEMS AND METHODS FOR PERFORMING TRAFFIC ENGINEERING THROUGH NETWORK SLICES

FIELD OF THE INVENTION

The present invention pertains to the field of network communications, and in particular to systems and methods for performing traffic engineering through network slices.

BACKGROUND

Traffic Engineering (TE) is a technique for managing data transmissions performed over a communications network. TE management entities typically make use of knowledge of a network topology and overall demands on resources to provide traffic flow management. To determine the routing of traffic flows over the network, TE entities may take into account statistical models of network traffic, queuing theory, data measurements, and simulations to model network operations. The modeling of the network allows TE to determine transmission parameters, capacities, and routes for transmitting data according to various network requests. Efficient application of TE techniques can serve to reduce the incidence of network traffic congestion, ensure adherence to quality of service (QoS) requirements, and reduce network costs through successful forecasting of operations.

This background information is provided to reveal information believed by the applicant to be of possible relevance to the present invention. No admission is necessarily intended, nor should be construed, that any of the preceding information constitutes prior art against the present invention.

SUMMARY

An object of embodiments is to provide a system and method for performing traffic engineering on a communications network through network slices.

In accordance with embodiments of the present invention, there is provided a method for performing traffic engineering on a communications network through a plurality of network slices, each network slice of the plurality of network slices configured to manage a service for transmitting data along one or more flows traversing nodes of the communications network using a portion of physical link resources. The method comprising allocating the portion of physical link resources of the communications network associated with a first network slice in the plurality of network slices in accordance with instructions received from a traffic engineering entity associated with the first network slice.

In accordance with embodiments of the present invention, there is provided a resource allocation apparatus. The resource allocation apparatus comprising a processor; an input interface coupled to the processor, the input interface for receiving instructions from a traffic engineering entity associated with a first network slice from a plurality of network slices each configured to manage a service for transmitting data along one or more flows traversing nodes of a communications network; a memory coupled to the processor, the memory having recorded thereon statements and instructions when executed by the processor to allocate a portion of physical link resources of the communications network associated with the first network slice in accordance with the instructions from the traffic engineering entity associated with the first network slice; and an output interface for providing the portion of physical link resources associated with the first network slice for transmitting data along its one or more flows using its allocated portion of physical link resources.

In accordance with embodiments of the present invention, there is provided a method for performing traffic engineering in a communications network through a first network slice managing a first service, and a second network slice managing a second service. The method comprising transmitting or receiving data associated with the first service according to the first network slice; and transmitting or receiving data associated with the second service according to the second network slice.

In accordance with embodiments of the present invention, there is provided a network node. The network node comprising a processor; an input interface coupled to the processor for receiving a first control signal from a first network slice, data associated with a first service managed by the first network slice, a second control signal from a second network slice, and data associated with a second service managed by the second network slice; a memory coupled to the processor and having stored thereon statements and instructions when executed by the processor to receive or transmit the data associated with the first service according to the first control signal, and receive or transmit the data associated with the second service according to the second control signal; and an output interface coupled to the processor for transmitting the data associated with the first service, and transmitting the data associated with the second service.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
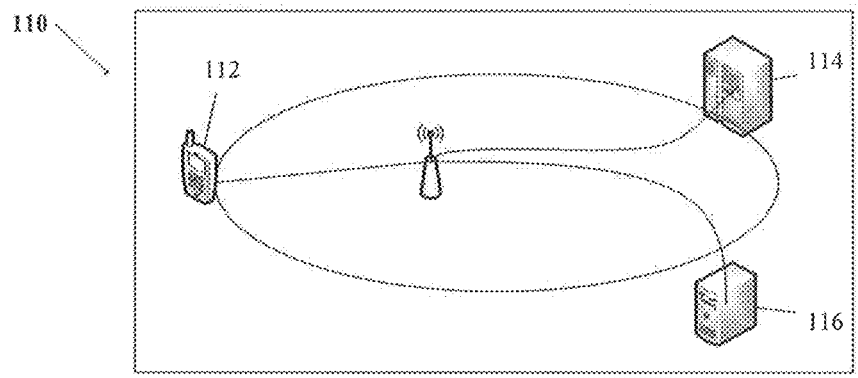
FIGS. 1A-C illustrate different granularities of network slices, according to an embodiment.

As used herein, a "network" or "communication network" comprises a plurality of nodes that may serve various devices including wireless devices and user equipment. The nodes may be physical (e.g. access points, routers, base stations, eNodeB's, gateway etc.) or include virtualized components as will become readily apparent herein. In one example, the network may have a reconfigurable variable architecture, and may support network slicing as further described below. Variability in the network architecture can allow a single network to meet competing demands in different usage scenarios. As a result, the application of these techniques to mobile networks is of great interest, and they are likely to form the foundation of fifth generation (5G) wireless mobile networks.

Communication networks may be flexibly organized through technologies such as Network Function Virtualization (NFV) and Software Defined Networking Network slicing is one feature that may be implemented in advanced networks, that provides the ability to create isolated virtual networks over which different data flows can travel.

A network slice (as defined in 3GPP TR 22.891 entitled "Study on New Services and Markets Technology Enablers") is a collection of logical functions that support communication service requirements for one or more network services. Network slicing may be performed on NFV based networks to manage respective services associated with each slice, while isolating the traffic of one network slice from another slice to ensure independent operation, and to meet specific quality of service (QoS) requirements. Accordingly, network slicing can provide distinct virtual networks running on the same physical set of network and computing resources. For example, each network slice can meet different service demands. This can also be used to create virtual networks dedicated to particular types of network traffic. Different network slices on the same infrastructure may allow for competing service demands to be satisfied without requiring that the network be provisioned to provide the most demanding requirements from each service across the entire network.

Embodiments of the present invention are directed towards systems and methods for performing traffic engineering in a slice of a communications network such that the traffic engineering decisions can be propagated out of the confines of the slice an into the resources of the underlying communications network. Each network slice may be allocated a proportion of the network's physical link resources (e.g. bandwidth or capacity of the physical links between nodes). Each network slice then performs TE on its own flows using the allocated share of resources in the underlying network. Performing TE functions across multiple network slices provides scalable, modularized operation, which can reduce operational complexity of the communications network while also improving network efficiency.

As indicated above, network slices are isolated from each other. Thus, each slice can independently support network service requests (i.e. "services"), each of which may be required to meet certain performance guarantees. For example, each slice may be dedicated to a different type of traffic (e.g. each having different packet processing and QoS requirements), a different customer, a different service, or different groups of services. Each service may include one or more flows, where each flow comprises a source and destination pair (e.g. between network points, nodes, functions or slices) having a certain demand (i.e. transmission speed or bandwidth) to meet QoS requirements of the service. When the service adheres to a service function chain (SFC), the flow may traverse certain intervening service functions. Each of the functions in the SFC is responsible for performing certain functions.

Figure 1B:
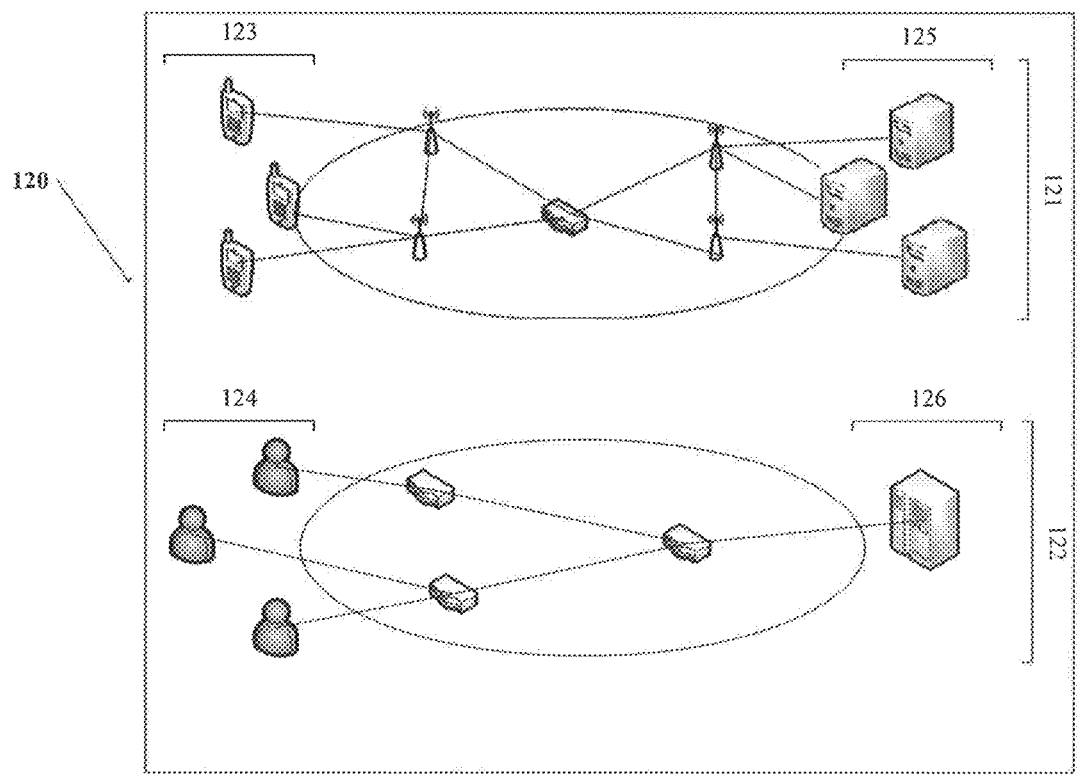
Figure 1C:
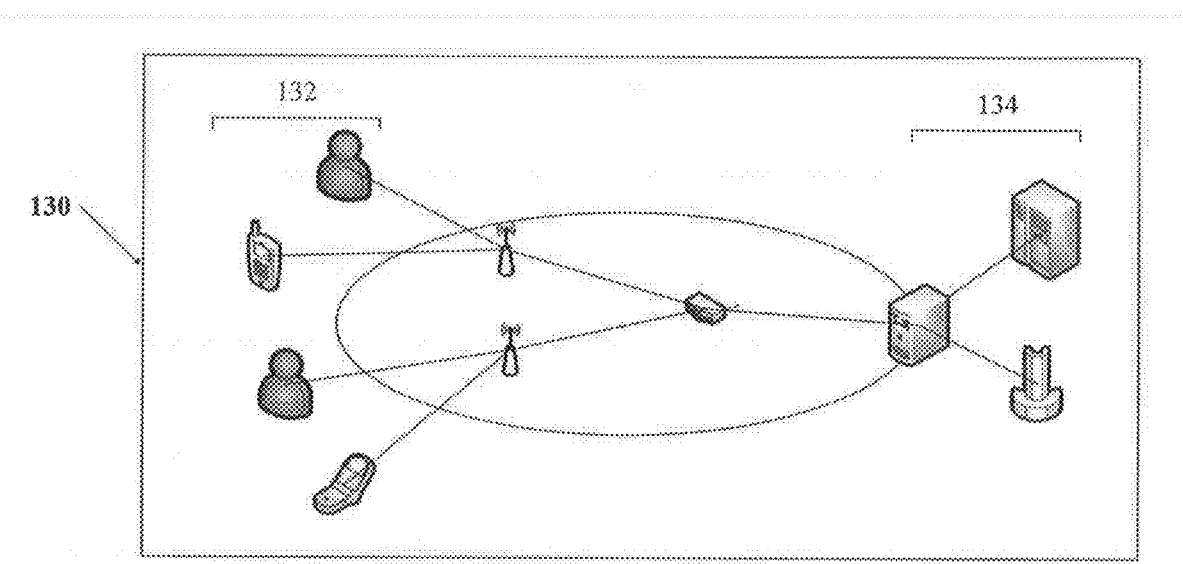

FIGS. 1A-C illustrates different granularities of network slices being isolated according to different criteria, according to various embodiments. FIG. 1A illustrates a per-customer network slice 110 dedicated to a single customer (node 112) for managing a service including 2 flows: a first flow from a source node 112 to a first destination node 114, and a second flow from the first source node 112 to second destination node 116. Each flow may each have a certain demand (for example, if the demand is a throughput requirement, 5 Mbps) in order to meet a desired QoS requirement for the service. FIG. 1B illustrates a per-service network slice 120 used for managing flows of different types of network services. Each service may comprise different flows having similar characteristics or undergoing specific functions. As shown, a Mobile Broadband (MBB) service 121 includes various flows between source nodes 123 and destination nodes 125. An eHealth service 122 includes various flows between various source nodes 124 and a destination node 126. Because MBB and eHealth traffic differ from each other in many different characteristics, they can be separated on the network so that the allocation of resources to each service is tailored for the service needs. FIG. 1C illustrates a per-group of services network slice 130 used for simultaneously managing flows between various source nodes 132 and destination nodes 134 for different groups of services across the same network infrastructure.

Figure 2A:
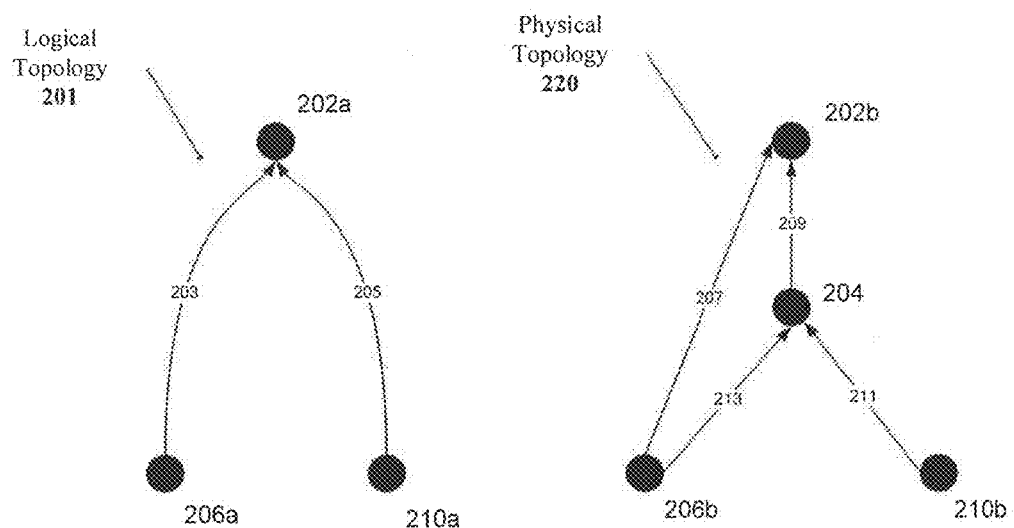
FIG. 2A illustrates a logical topology and corresponding physical topology, according to an embodiment.
Figure 2B:
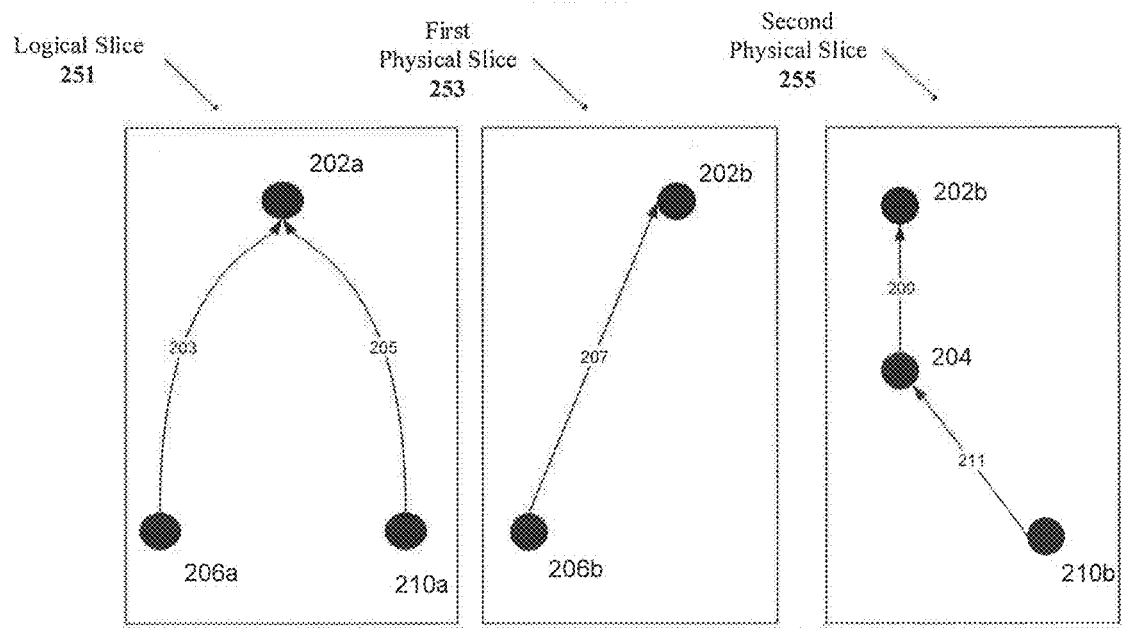
FIG. 2B illustrates network slices derived from the topologies of FIG. 2A, according to an embodiment.

FIGS. 2A-B illustrates differences between a logical topology and a physical topology, and slicing performed on the respective topologies, according to an embodiment. Referring to FIG. 2A, a logical topology 201 and corresponding physical topology 220 is shown, while FIG. 2B illustrates a network slice 251 derived from logical topology 201 ("logical slice"), and network slices 253, 255 derived from physical topology 220. The physical topology 220, may correspond to the physical architecture of a communications network, for example.

As shown in FIG. 2A, the logical topology 201 comprises a first service gateway node 206a, a second service gateway node 210a, a packet gateway node 202a and corresponding flows 203, 205 communicatively coupling the service gateway nodes 206a, 210a to the packet gateway node 202a, respectively. The flows 203, 205 each have certain demands (i.e. minimum guaranteed capacities) in order to meet certain QoS requirements. For example, flow 203 may demand a 10 Mbps capacity, while flow 205 may only demand a 5 Mbps capacity for a given service. In the case of service function chaining (SFC), the logical topology may further include intermediate service function nodes (not shown) across which respective flows may traverse for performing specific functions associated with a given service.

Logical topology 201 may be practically implemented through corresponding physical topology 220 comprising a first service gateway node 206b, second service gateway node 210b, intermediate node 204, and packet gateway node 202b. Each of the nodes 202b, 204, 206b, 210b are communicatively coupled via physical links 207, 209, 211, and 213 as shown. Each physical link may also have specific capacities corresponding to physical limitations of the network. For example, physical link 207 may have a 10 Mbps capacity, while physical links 209, 211, and 213 may have 5 Mbps capacities.

FIG. 2B illustrates various network slices derived from logical topology 201 and physical topology 220 of FIG. 2A, according to an embodiment. For example, the logical slice 251 may be instantiated using logical topology 201 to perform a service along an associated flow (e.g. flow 205 between nodes 210a and 202a) with a certain demand (e.g. 5 Mbps). However, the logical slice 251 does not fully provide the physical details (i.e. physical links and intervening nodes along a path) for transmitting data along associated flows at the required demand. For example, flow 205 in logical topology 201 does not have an analogous counterpart in the physical topology 220, and is alternatively be implemented through physical links 211 and 209, via intermediate node 204. In contrast, the first physical slice 253 instantiated using physical topology 220 includes the logical link 207 meeting the required demand (e.g. 10 Mbps) between the first service gateway node 206b and packet gateway node 202b. The second physical slice 255 also provides the logical links 209, 2011 between the second service gateway node 210b and the packet gateway node 202b, including the intermediate node 204 coupling logical links 209, 211. Accordingly, the use of physical slicing provides additional implementation details for establishing flows along physical links of a physical topology which meet a desired demand for a given service. The use of physical slicing also describes the share or resources on every single link. In certain embodiments, mapping between logical and physical slices may be performed in order to retrieve physical details for establishing flows satisfying a particular service on a communications network.

Figure 3:
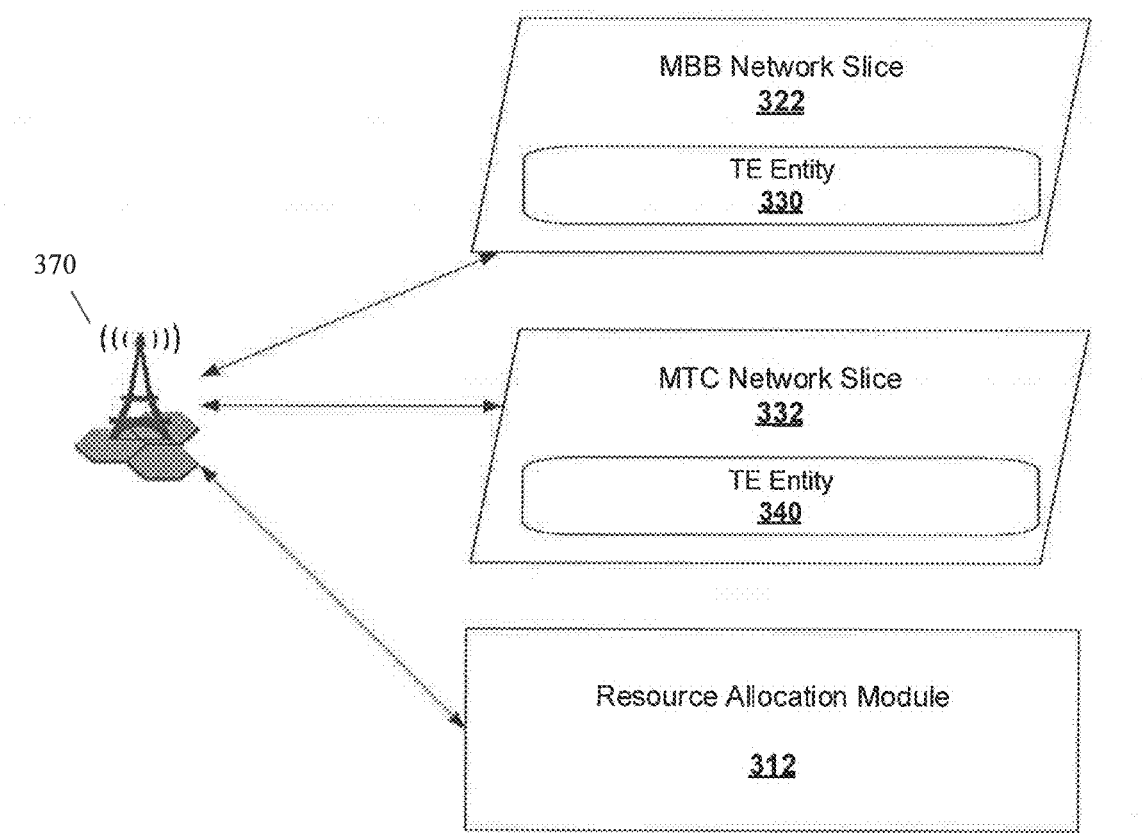
FIG. 3 illustrates an access node of a communication network having various functions deployed thereon, according to an embodiment.

FIG. 3 illustrates an access node 370 of a communications network (entire network not shown) having various functions (for example, VNF based functions) deployed thereon, according to an embodiment. A mobile broad band (MBB) network slice 322 is provided for managing MBB related services over the communications network, and includes a Traffic Engineering (TE) entity 330 for performing traffic engineering for flows related to the services that the MBB slice 332 manages. A machine type communication (MTC) network slice 332 is also provided for managing MTC related services over the communications network, and also includes its own TE entity 340 for performing traffic engineering for flows related to the services that the MTC network slice 332 manages. Finally, a resource allocation module 312 (which may comprise a Software Defined Resource Allocation Module (SDRA) in some embodiments) is configured to apportion physical link resources of the communications network to each of MBB network slice 322 and MTC network slice 332, according to instructions from each of the TE entities 330, 340, respectively, and will be discussed in greater detail below.

TE entities 330, 340, of MBB network slice 322 and MTC network slice 332 respectively, each perform traffic engineering functions (e.g. such as apply statistics and/or simulations to analyze, predict, and regulate the behaviour of data transmissions over the network 300) for flows associated with services of each respective network slice 322, 332. For example, TE entities 330, 340 may utilize aggregate properties over a long period of time to simulate network behaviour, in order to help determine transmission parameters and routes for more efficient data transmissions. Accordingly, TE entities 330, 340 can be used to achieve a particular Quality of Service (QoS) for the service(s) each manages, or to balance a QoS against the cost of operating and maintaining the network.

For example, the MBB network slice 322 may control access node 370 to transmit or receive data associated with an MBB service, while the MTC slice 332 may also control the access node 370 to transmit or receive data associated with an MTC service. In certain embodiments, the resource allocation module 312 may allocate a first portion of physical link resources of the communications network to the MBB network slice 322 for transmitting or receiving data associated with the MBB service, and further allocate a second portion of physical link resources to the MTC slice 332 for transmitting or receiving data associated with the MTC service. MBB slice 322 and MTC slice 332 may both control the access node 370 to receive or transmit data using control signals via functional control links, which may operate according to TE entities 330, 340 of the respective slices. In this way, traffic engineering for a communications network may be performed in a distributed manner through a plurality of network slices, with each network slice having control of network access nodes to receive or transmit data (across physical links between other access nodes, not shown) associated with each slice.

Figure 4A:
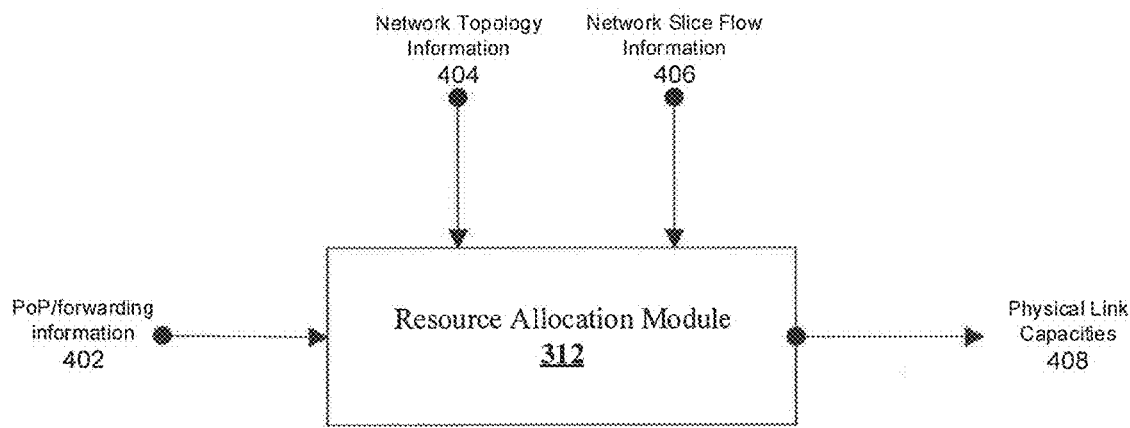
FIG. 4A is a functional schematic of a Resource Allocation module, according to an embodiment.

FIG. 4A is a functional schematic of the resource allocation module 312 of FIG. 3, according to an embodiment. The resource allocation module 312 is configured to apportion physical link resources of a communications network in accordance with instructions from TE entities of network slices, and allocate the apportioned physical link resources between each of a plurality of network slices operating on the communications network. In one embodiment, the resource allocation module 312 receives instructions such as: forwarding graph information 402, or other information related to the Point of Presence (PoP) hosting the service function. This information may alternately be received, for example, from a software defined topology module (not shown). This information can be used to ensure that certain flows are directed through specific points/nodes in a service function chain. The resource allocation module 312 may also receive instructions such as network topology information 404, and flow information 406 for all network slices (for example, from TE entities of network slices), and provides physical link capacities 408 (e.g. bandwidth or transmission capacities) for each network slice 322, 332 based on these input instructions. Accordingly, the resource allocation module 312 observes services and related flows across the communications network for all network slices, and allocates physical link resources (i.e. maximum capacity or bandwidth usable on each physical link) to each slice. In this way, physical link resources can be appropriately apportioned between network slices. By apportioning physical link resources between the network slices, QoS requirements for services within in each network slice can be met. In certain embodiments, the resource allocation module 312 can also instantiate network slices and assign physical link resources as necessary, in order to more efficiently help manage network services. Additionally, the resource allocation module 312 may comprise a software defined resource allocation (SDRA) module, for example, instantiated as a VNF, in certain embodiments.

Figure 4B:
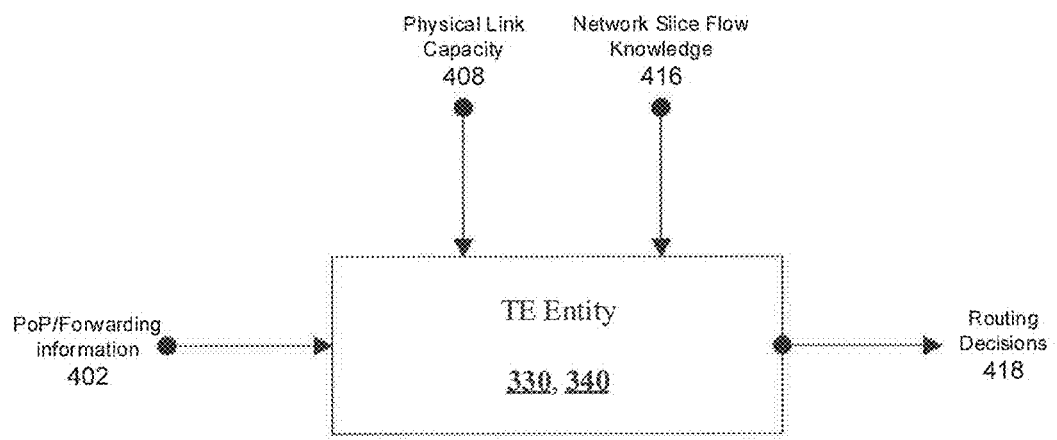
FIG. 4B is functional schematic of a Traffic Engineering entity of a network slice, according to an embodiment.

FIG. 4B is a functional schematic of the TE entities 330, 340 of respective network slices 322, 332 in FIG. 3, according to an embodiment. TE entities 330, 340 are configured to manage the transmission of data along flows associated with respective network slices 322, 332 according to traffic engineering functions and their allocated share physical link resources. In one embodiment, the TE entities 330, 340 receive Service Function Point of Presence (PoP)/Forwarding graph information 402 (for example from SDT module 308), allocated physical link capacities 408 (from resource allocation module 312, for example), and flow information 416 (for flows associated with the respective slice) and provides routing decisions 418 for flows managed by the slice (for example, to a Scheduler function (not shown)). In this way, each TE entity 330, 340 independently manages traffic engineering functions for flows associated with its respective network slice 322, 332. Accordingly, traffic engineering functions that would otherwise be performed globally from a single entity for the entire network 300, are now distributed between network slices which perform traffic engineering functions for flows associated with each slice. Traffic engineering functions can therefore be scaled and configured to tune performance of each network slice 322, 332 by dynamically analyzing, predicting and regulating behaviour of data transmitted with each network slice 322 332, instead of requiring network wide analysis.

In certain embodiments, TE entities 330, 340 may utilize a flow-based, or a service-based TE algorithm, in order to determine routing decisions 418 for flows controlled by each slice, according to given inputs. Examples of flow-based and serviced based TE algorithms may be found in U.S. patent application Ser. Nos. 14/870,649, and 14/097,930, which are incorporated by reference herein.

As discussed above with reference to FIGS. 4A-4B, by first allocating physical link capacities of the communications network through SDRA module 312 between network slices 322, 332, and then performing traffic engineering with TE entities 330, 340 for flows associated with each network slice 322, 332, traffic engineering over the entire network 300 can be performed in a more selective and modularized manner which may improve overall efficiency of the communications network.

Figure 5A:
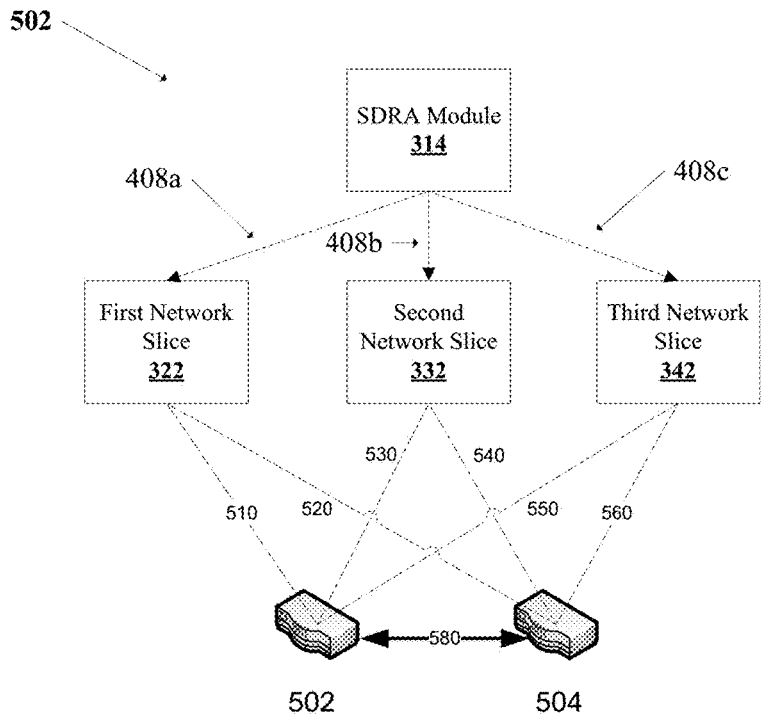
FIG. 5A is a communication network having three network slices deployed thereon, according to an embodiment.

FIG. 5A illustrates a communications network 502, according to another embodiment. The communications network 502 comprises a first node 502, and a second node 504, upon which an SDRA module 314, a first network slice 332, a second network slice 332, a third network slice 342 are functionally deployed (i.e. instantiated or "built"). The first and second node 502, 504 are communicatively coupled through a physical link 580. Each of the network slices 322, 332, 342 manage a respective service having a flow across physical link 580, and requiring a certain transmission demand. In operation, the SDRA module 314 allocates a portion of the capacity of physical link 580 between network slices 322, 332, 342 via functional control links 408a, 408b, 408c, respectively, which may best meet their respective service demands. The allocation may be made, for example, according to a resource assignment algorithm (e.g. flow based, or group-flow based) as will be discussed further below. The network slices 322, 332, 342, having received portions of the physical link 580's capacity, may each make use of their own Traffic Engineering entity (not shown) to perform traffic engineering functions (e.g. packet routing according to QoS requirements) using respective functional control links 510, 520, 530, 540, 550, 560 for managing respective flows across physical link 580. Therefore, the first node 502 and the second node 504 can receive control information from Traffic Engineering entities associated with each of the network slices 322, 332, 342. This allows each slice to transmit data associated with the service managed by each slice across the physical link 580, using each slice's allocated portion of physical link 580's capacity. In embodiments comprising more than two nodes (not shown), traffic engineering functions from each network slice may comprise appropriate routing decisions for controlling transmission of data along paths between multiple and potentially intervening nodes.

As an illustrative example, the physical link 580 may have a total capacity of 12 Mbps, and each network slice 322, 332, 342 may require a 4 Mbps share in order to meet the demand of the respective service they are managing. Accordingly, the SDRA module 314 may allocate a 4 Mbps share of the physical link 580 to each of the network slices 322, 332, 342 based on their service demands. The network slices 322, 332, 342 each having been allocated a 4 Mbps logical connection that forms each slice's share of physical link 580, may thereafter perform traffic engineering using their apportioned share of the physical link 580. Instructions sent from TE entities in each of the network slices 322, 332, 342 are then received by nodes 502 and 504, allowing each slice's traffic on physical link 580 to be treated as determined by the respective TE entities.

Figure 5B:
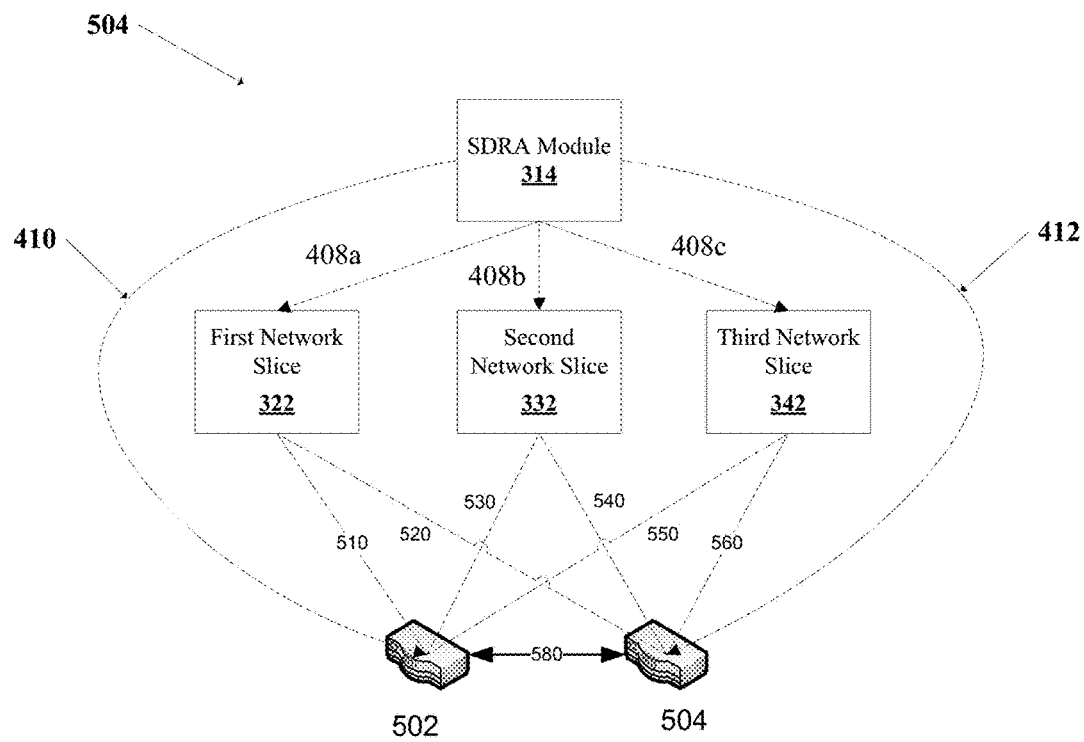
FIG. 5B is a communication network having nodes communicatively coupled to an SDRA module, according to an embodiment.

FIG. 5B illustrates a communications network 504, according to another embodiment. The communications network 504 in FIG. 5B is similar to communications network 502 shown in FIG. 5A, except in that the SDRA module 314 is further communicatively coupled to the first node 502 via first functional node link 410, and to the second node 504 via second functional node link 412. In operation, the SDRA module 312 determines and allocates a portion of physical link 580 to each of network slices 322, 332, 342 via functional control links 408a, 408b, 408c, respectively. The SDRA module 314 also informs nodes 502, 504 of the physical link capacities allocated to each slice 322, 332, 342. This allows individual nodes 502, 504 to police traffic across physical link 580 so that the traffic from any given slice 322, 332, 342 does not exceed the allocated amount. The network slices 322, 332, 342 may accordingly perform traffic engineering functions for transmitting packets using their allocated share of physical link 580. Should any of the network slices 322, 332, 342 attempt to exceed their allocated capacities, nodes 502, 504 can prevent usage exceeding their allocated amount. In this way, allocated physical link capacities between network slices 322, 332, 342 can be enforced by nodes 502, 504.

In other embodiments (not shown), the nodes 502, 504 in FIG. 5B can adhere to certain policies for enforcing link capacity allocation to slices. For example, nodes 502, 504 may grant a temporary link capacity increase for a specific slice, if another slice will not be using the capacity at that time.

Figure 6:
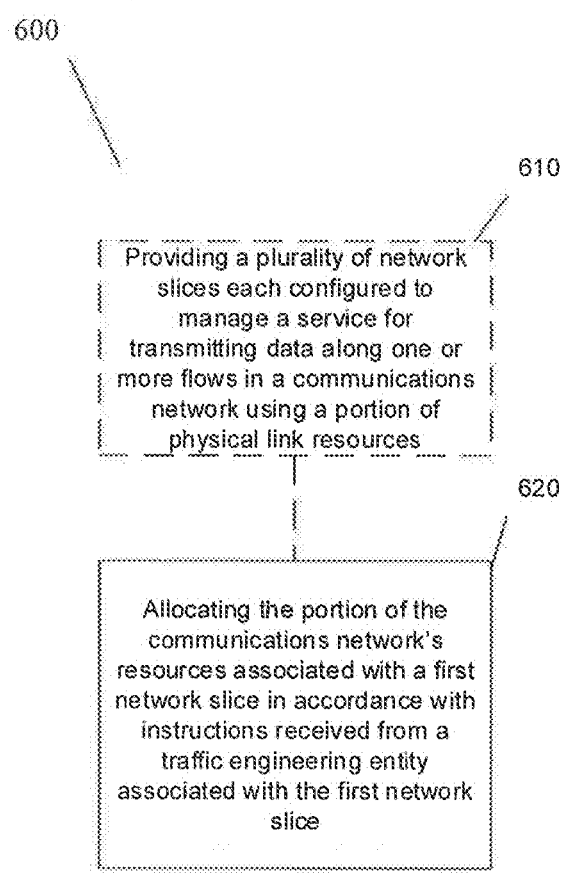
FIG. 6 is a flow chart illustrating a method for performing traffic engineering on a communications network, according to an embodiment.

FIG. 6 is a flow chart illustrating a method 600 for performing traffic engineering on a communication network through a plurality of network slices, according to an embodiment. The underlying resources used by network slices may be provided (e.g. instantiated nodes) by the communications network, or may use resources borrowed from another network or network operator, and are configured to manage a service including the transmission of data along one or more flows traversing nodes of the communications network using an allocated portion of the communication network resources. The method 600 may be performed by resource allocation module 312 or SDRA 314 for network slices 322, 332, for example. At step 620, a portion of the communications network's resources are allocated to (i.e. associated with) a first network slice in accordance with instructions received from a traffic engineering entity associated with the first network slice; this allows the first network slice to then transmit data along the one or more flows of the service it manages using the allocation portion of network resources. The instructions may comprise: point of presence information, forwarding graph information, network topology information, and network slice flow information. The resources may comprise portions of physical link capacities between various nodes of the communications network, and may be allocated to network slices according to the QoS requirements of the service(s) it manages.

In some embodiments, resources may be allocated to the first network slice further according to a flow based resource assignment algorithm, or a group flow based resource assignment algorithm, both of which may account for multiple TE related conditions and constraints as will be discussed in further detail below.

In some embodiments, a portion of physical link resources may be further allocated to each of the plurality of network slices in accordance with instructions received from traffic engineering entities associated with each of the network slices. For example, network slices that manage services having greater demands, may be allocated a greater proportion of physical link capacities, while network slices that manage services having lower demands, may be allocated a lower proportion of physical link capacities. Network slices having been allocated resources of the communications network, can in turn manage respective services using respective TE entities, including transmission of data along one or more associated flows along the communications network. The data may be transmitted for example, in accordance with traffic engineering functions performed by each network slice.

In certain embodiments (not shown), the network slices may be specifically provided (instantiated, created or defined) by the communications network in order to manage certain service requests. In such embodiments, an optional step 610 may be included of providing the plurality of network slices, each configured to manage a service for transmitting data along one or more flows in a communications network using allocated network resources. Each network slice may also comprise a traffic engineering entity for transmitting data along flows in accordance with traffic engineering functions that may include packet routing and scheduling functionality.

Figure 7:
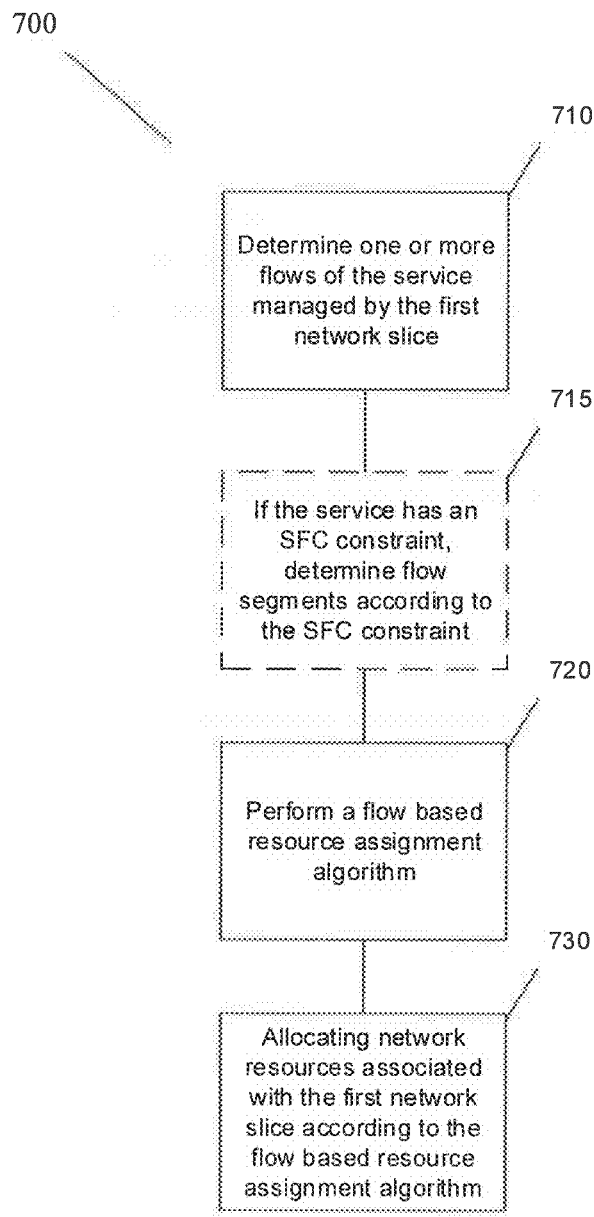
FIG. 7 is a flow chart illustrating an embodiment of step 620 of FIG. 6 for allocating network resources according to a flow based resource assignment algorithm.

FIG. 7 is a flow chart 700 illustrating an embodiment of step 620 of FIG. 6 above using a flow based resource assignment algorithm, which may be performed by SDRA 314 interacting with network slices 322, 332 of FIG. 5, for example. At step 710, one or more flows associated with the service managed by the first network slice is determined. For example, the one or more flows may be derived from instructions from the TE entity of the first network slice. If the service has an SFC constraint, flow segments may be identified according to the SFC constraint at step 715. A flow segment may be defined as the intermediate links between nodes of a flow, as will be explained in further detail below. At step 720, a flow based resource assignment algorithm is performed over the network, using the identified flows (and flow segments in the case of SFC constraints) to determine the resource usage of individual flows. The flow based resource assignment algorithm may additionally account for the flow segments identified in step 715 in the case of SFC constraints, and may comprise a traffic engineering algorithm in certain embodiments. At step 730 network resources are allocated to the first network slice according to the flow based resource assignment algorithm. For example, a portion of physical link resources of the communications network may be allocated to the first slice according to that required for its associated flows as determined by the flow based resource assignment algorithm.

As an example illustrating the steps in flow chart 700 above, a network may have deployed two network slices ($S_1$, $S_2$), wherein the first slice $S_1$ manages a service having two flows ($f_1$, $f_2$), and the second slice $S_2$ manages another service having two flows ($f_3$, $f_4$). An SDRA 314 at step 710 thus determines there are total 4 flows (e.g. $f_1$, $f_2$, $f_3$, $f_4$) to be performed over the network through the two network slices. If the services have SFC constraints, then flow segments adhering to the SFC constraints may be determined at step 715; this is explained in further detail below. At step 720, the SDRA 314 performs a flow-based resource assignment algorithm to determine the resource usage (e.g. $R_1$, $R_2$, $R_3$, $R_4$) required for each flow ($f_1$, $f_2$, $f_3$, $f_4$). At step 730, the SDRA 314 then allocates resources of the physical links to each slice ($S_1$, $S_2$) according to the flows of the services which they manage (e.g. $S_1 \rightarrow R_1+R_2$; $S_2 \rightarrow R_3+R_4$). This allows the network slices ($S_1$, $S_2$) to transmit data along flows of the service it manages, using the network resources allocated to each slice (e.g. $S_1 \rightarrow R_1+R_2$; $S_2 \rightarrow R_3+R_4$). For example, the first slice $S_1$ may manage a service requiring transmission of data along flows $f_1$, $f_2$, and can use allocated resources $R_1+R_2$ to do such. The second slice $S_2$ may manage a service requiring transmitting data along flows $f_3$, $f_4$, and can use its allocated resources $R_3+R_4$ to do such. Both the first and second slices ($S_1$, $S_2$) may execute respective transmissions through traffic engineering functions of each slice. In this way, each network slice may be allocated an appropriate share of the physical link resources in order to manage flows of respective services.

In embodiments where services have SFC constraints, the corresponding flows will traverse appropriate service function nodes in accordance with the SFC. Following the example above, if the service managed by the first slice $S_1$ has an SFC constraint requiring packets travel through service function node $N_1$, then flows ($f_1$, $f_2$) managed by the first slice $S_1$ would traverse service function node $N_1$. In step 715, flow segments may be identified from respective flows ($f_1$, $f_2$) which traverse service function node $N_1$ in accordance with the SFC.

Figure 8:
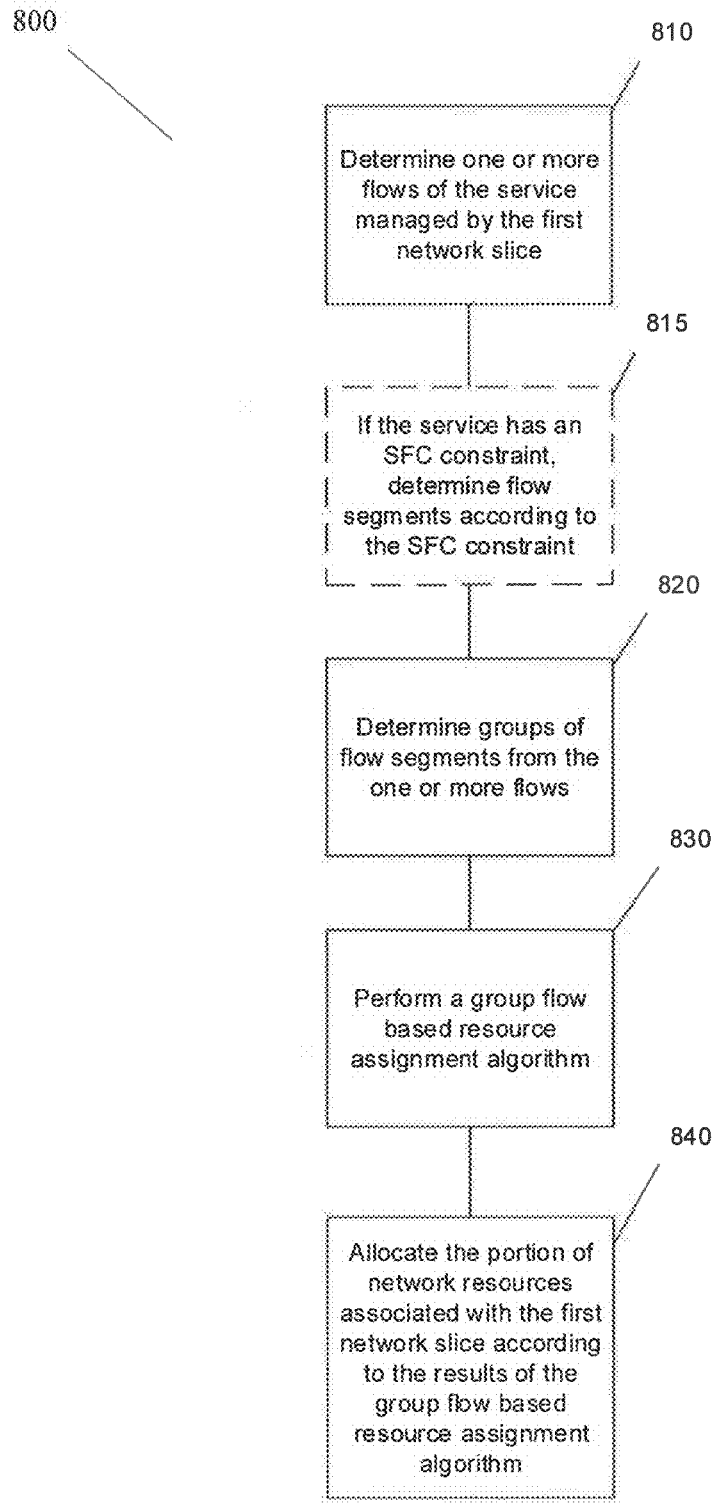
FIG. 8 is a flow chart illustrating another embodiment of step 620 of FIG. 6 for allocating network resources using a group-flow segment based resource assignment algorithm.

FIG. 8 is a flow chart 800 illustrating another embodiment of step 620 of FIG. 6 above using a group flow based resource assignment algorithm. In contrast to flow chart 700 which at step 730 allocates network resources using individual flows, flow chart 800 differs at least in that resources are allocated to network slices based on groups of flow segments. As will be described in further detail blow, allocation of network resources based on groups of flow segments can reduce the complexity in determining appropriate shares of network resources (e.g. portions of physical link resources) for each network slice. At step 810 one or more flows of the service managed by a first network slice is determined. For example, the one or more flows may be derived from instructions from the first network slice. If the service has an SFC constraint, step 815 may be performed by identifying flow segments according to the SFC constraints. At step 820, groups of flow segments are identified from the one or more flows, as will be explained in further detail below. At step 830, a group flow-based resource assignment algorithm is performed over the network according to the identified groups of flow segments. At step 840, network resources are allocated to the first network slice according to the results of the group flow-based resource assignment algorithm.

Figure 9:
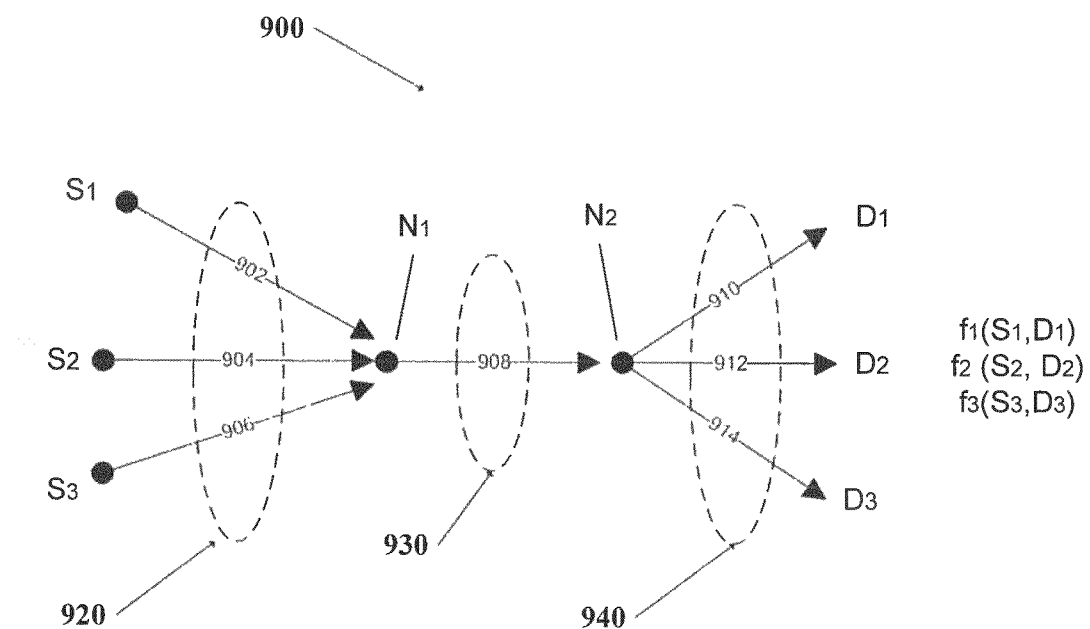
FIG. 9 is a logical topology illustrating identification of groups of flow segments, according to an embodiment.

FIG. 9 is an example of a logical topology 900 having 3 flows (f$_1$, f$_2$, f$_3$) transposed thereon, and corresponding to a service within a single network slice. FIG. 9 illustrates identification of flow segments and groups of flow segments as described in steps 715, 815, and 820 above, according to an embodiment. In this example, the service adheres to a SFC comprising service functions N$_1$, N$_2$. All flows within the service traverse through service function points N$_1$ and N$_2$. As shown in FIG. 9, the first flow f$_1$ (S$_1$,D$_1$) includes flow segment 902, flow segment 908, and flow segment 910. The second flow f$_2$ (S$_2$,D$_2$) includes flow segment 904, flow segment 908, and flow segment 912. The third flow f$_3$ (S$_3$, D$_3$) includes flow segment 906, flow segment 908, and flow segment 914. Accordingly, there are nine individual flow segments: 902, 904, 906, 908 (three times), 910, 912, 914 (overlapping flow segment 908 is counted separately for each flow), from flows involving two service functions N$_1$, N$_2$ which perform SFC related functions on traversing packets.

In one embodiment, a group of flow segments includes those flow segments having a common starting node, a common ending node, or both. For example, a first group 920 includes flow segments sharing the same ending point N$_1$ (flow segments 902, 904, 906), the second group 930 includes flow segments sharing the same starting point N$_1$ and ending point N$_2$ (flow segment 908), and the third group 940 includes those flow segments sharing the same starting point N$_2$ (flow segments 910, 912, 914).

By identifying groups of flow segments (or groups of flows in certain embodiments which do not require SFC or include intervening nodes) in step 820 and as further illustrated in the example of FIG. 9, the number of variables that must be considered in a subsequent resource allocation algorithm (e.g. step 830) can be reduced when compared to other methods. This is particularly true for embodiments involving a large number of flows over a given topology, and may reduce the complexity required, for example by SDRA function 314, in determining the allocation of physical link resources to network slices.

Figure 10:
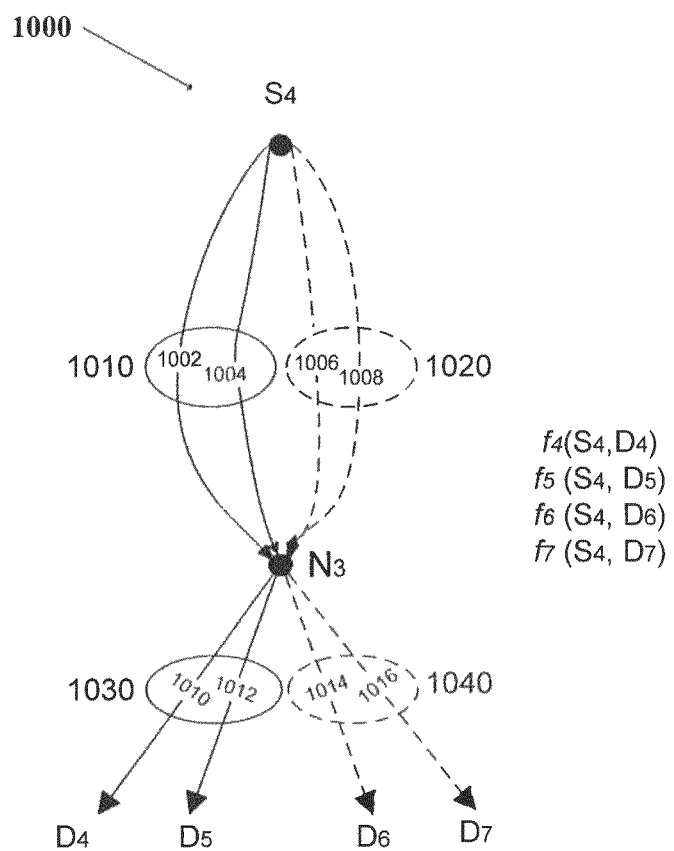
FIG. 10 is a logical topology illustrating identification of groups of flow segments for two network slices operating over a communications network, according to an embodiment.

FIG. 10 is a logical topology 1000 corresponding to a communications network having four flows (f$_4$, f$_5$, f$_6$, f$_7$) mapped thereon from services managed by two network slices (not shown), and used to further illustrate grouping of flow segments in steps 715, 815, and 820 above, according to another embodiment. In this example, a first network slice manages a service including flow f$_4$(S$_4$,D$_4$) and flow f$_5$(S$_4$, D$_5$), while the second network slice manages a service including flow f$_6$(S$_4$, D$_6$) and flow f$_7$(S$_4$, D$_7$). Additionally, both services make use of a SFC comprising service function N$_3$, and therefore the flows traverse service function N$_3$. When multiple network slices are involved, the identification of flow segments and groups of flow segments may be performed for each individual slice such that a group of flow segments for a particular slice does not include flow segments belonging to another slice. This will help ensure proper allocation of physical resources to each network slice so that one slice does not negatively affect operation of another slice.

With reference to FIG. 10, the first network slice manages a service with flow f$_4$(S$_4$,D$_4$) including flow segment 1002 and flow segment 1010, and flow f$_5$(S$_4$,D$_5$) including flow segment 1004, and flow segment 1012. The second network slice manages a service with flow f$_6$(S$_4$,D$_6$) having flow segment 1006, and flow segment 1014, and flow f$_7$(S$_4$,D$_7$) including flow segment 1008, and flow segment 1016. Since there are two network slices operating on physical topology 1000, groups of flow segments are identified for each network slice. For the first network slice, a first group 1010 is identified having flow segments 1002 and 1004, and a second group 1030 is identified having flow segments 1010 and 1012. For the second network slice, a first group 1020 is identified having flow segments 1006 and 1008, and a second group 1040 is identified having flow segments 1014 and 1016. Accordingly, there are 4 total flow-segment groups (groups 1010 and 1030 for the first network slice, and groups 1020, and 1040 for the second network slice), that may be identified for application in a subsequent resource allocation algorithm (i.e. step 830 in method 800).

Referring back to FIG. 8, the group flow-based resource assignment algorithm in step 830 may comprise any suitable algorithm for performance of traffic engineering functions based on group-flow segments. For example, the group flow-based resource assignment algorithm may comprise a set of flow group conservation constraints for each node n, such as that shown in equation (1) below:

$$\sum_{a \in A_{in}(n)} x_a^k - \sum_{a \in A_{out}(n)} x_a^k = \begin{cases} 0, & n \notin S^k, n \notin D^k \\ -d_S^k(n), & n \in S^k \\ d_D^k(n), & n \in D^k \end{cases} \quad (1)$$

where:
G(N,A): Network Graph
A$_{in}$(n): Set of links terminating at node n
A$_{out}$(n): Set of links originating at node n
K: Number of flow segment groups
d$_S^k$(n): Total demand (capacity/rate requirement) at a given source node n due to group k
d$_D^k$(n): Total demand (capacity/rate requirement) at a given destination node n due to group k
S$^k$: Set of source nodes for group k
D$^k$: Set of destination nodes for group k The group flow-based resource assignment algorithm may also further comprise a set of link capacity constraints, such as that shown in equation (2) below:

$$\sum_{k=1}^{K} x_a^k \leq c_a \quad (2)$$

where:
c$_a$: Capacity of link a
x$_a^k$: Allocation of group k on link a

In other embodiments, a suitable objective function may also be used for the group-flow based resource assignment algorithm. Examples of objective functions include load balancing, weighted max min, etc. Furthermore, other constraints in addition to flow-group conservation constraints and link capacity constraints may be added to account for issues such as delays or specific service requirements.

Figure 11:
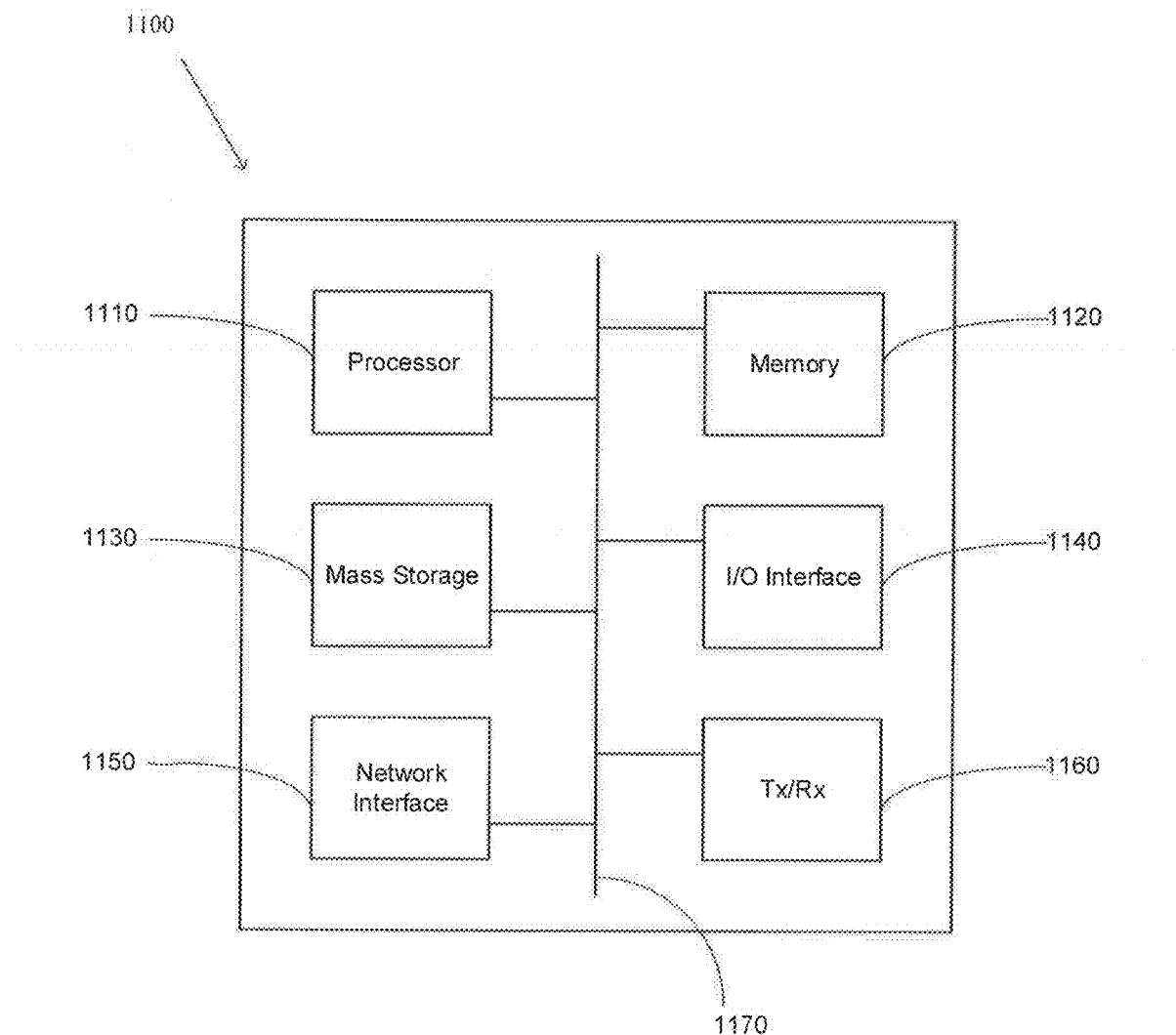
FIG. 11 is a schematic diagram of a hardware device, according to an embodiment.

FIG. 11 is schematic diagram of a hardware device 1100 that may comprise for example, the resource allocation module 312, SDRA module 314, or TE entities 330, 340, according to embodiments of the present invention. As shown, the hardware device includes a processor 1110, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the hardware device may contain multiple instances of certain elements, such as multiple processors, memories, or transceivers. Also, elements of the hardware device may be directly coupled to other elements without the bi-directional bus.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing the aforementioned functions and steps of the SDT module 308, SDRA module 312, network slices, or TE entities 330, 340.

As described above, embodiments of the present invention disclose systems and methods for transmitting data through flows of a communication network with one or more network slices using allocated network resources. Each network slice may be configured to manage a customer, a service, or groups of services having certain QoS requirements, and may be allocated a portion of the network's physical link resources to accomplish such. Allocation of the network's physical link resources may be performed by considering individual flows for all network slices, or by considering groups of flow segments through application of a group-based resource assignment algorithm. Upon allocation of network resources to respective network slices, each network slice may perform traffic engineering to transmit data along associated flows. This configuration provides a scalable and versatile traffic engineering architecture which may improve overall network efficiency.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for performing traffic engineering on a communications network through a plurality of network slices, each network slice of the plurality of network slices configured to manage a service for transmitting data along one or more flows traversing nodes of the communications network using a portion of physical link resources, the method comprising, a resource allocation module:
   receiving instructions for each of the plurality of network slices from each of the plurality of network slices or from a software defined topology module, wherein the instructions are selected from the list consisting of: point of presence information, forwarding graph information, network topology information, and network slice flow information;
   determining, in accordance with the instructions received, the portion of physical link resources of the communications network required by a first network slice to manage the service associated with the first network slice;
   allocating the portion of physical link resources of the communications network to the first network slice; and
   communicating said allocation to a first traffic engineering entity separate from the resource allocation module, wherein traffic engineering for the first network slice is performed by the first traffic engineering entity.

2. The method of claim 1 wherein determining and allocating the portion of physical link resources is performed further according to a flow based resource assignment algorithm, or a group flow based resource assignment algorithm.

3. The method of claim 2, wherein determining and allocating the portion of physical link resources according to the flow based resource assignment algorithm comprises:
   determining the one or more flows of the service managed by the first network slice from the instructions;
   performing the flow based resource assignment algorithm to determine physical link resource requirements for each of the one or more flows; and
   allocating the portion of physical link resources associated with the first network slice according to the determined physical link resource requirements for each of the one or more flows.

4. The method of claim 2, wherein determining and allocating the portion of physical link resources according to the group flow based resource assignment algorithm comprises:
   determining the one or more flows of the service managed by the first network slice from the instructions;
   determining groups of flow segments from the one or more flows;
   performing the group flow based resource assignment algorithm according to the determined groups of flow segments; and
   allocating the portion of physical link resources associated with the first network slice according to the results of the group flow based resource assignment algorithm.

5. The method of claim 2 wherein when the service comprises a service function chain, determining and allocating the portion of physical link resources further comprises determining flow segments according to the service function chain.

6. The method of claim 4 wherein each group of flow segments comprises one or more flow segments having a common starting node, a common ending node, or common starting and ending nodes.

7. The method of claim 4 wherein the groups of flow segments are determined for each network slice of the plurality of network slices.

8. The method of claim 4 wherein the group flow based resource assignment algorithm comprises a set of flow group conservation constraints.

9. The method of claim 8 wherein the set of flow group conservation constraints comprises:

$$\sum_{a \in A_{in}(n)} x_a^k - \sum_{a \in A_{Out}(n)} x_a^k = \begin{cases} 0, & n \notin S^k, n \notin D^k \\ -d_S^k(n), & n \in S^k \\ d_D^k(n), & n \in D^k \end{cases}$$

wherein n is a node in the communications network, k is a group of flow segments, a is a link in the communications network, $x_a^k$ is a physical resource allocation for group k on link a, $d_S^k(n)$ is the total demand at a given source node n due to the group of flow segments k, $d_D^k(n)$ is the total demand at a given destination node n due to the group of flow segments k, $S^k$ is a set of source nodes for the group of flow segments k, and $D^k$ is a set of destination nodes for the group of flow segments k.

10. The method of claim 4 wherein the group flow based resource assignment algorithm comprises a set of link capacity constraints.

11. The method of claim 10 wherein the set of link capacity constraints comprises:

$$\sum_{k=1}^{K} x_a^k \leq c_a$$

wherein k is a group of flow segments, a is a link in the communications network, $x_a^k$ is a physical resource allocation for group k on link a, and $C_a$ is a capacity of link a.

12. The method of claim 1 further comprising providing the plurality of network slices.

13. The method of claim 12 further comprising transmitting data, by each of the network slices, along the one or more flows of the service it manages using its allocated portion of physical link resources.

14. The method of claim 1 further comprising informing nodes of the communication network of the portion of physical link resources allocated to each network slice, and enforcing usage of the portion of physical link resources by each network slice with the nodes.

15. A resource allocation apparatus comprising:
a processor;
an input interface coupled to the processor, the input interface for receiving instructions for a plurality of network slices from each of the plurality of network slices or a software defined topology module, each network slice configured to manage a service for transmitting data along one or more flows traversing nodes of a communications network, wherein the instructions are selected from the list consisting of: point of presence information, forwarding graph information, network topology information, and network slice flow information;
a memory coupled to the processor, the memory having recorded thereon statements and instructions when executed by the processor to:
determine, in accordance with the received instructions, the portion of physical link resources of the communications network required by a first network slice to manage the service associated with the first network slice; and
allocate the portion of physical link resources of the communications network to the first network slice; and
an output interface for providing, to a traffic engineering controller separate from the resource allocation apparatus, an indication of the portion of physical link resources associated with the first network slice for transmitting data along its one or more flows using its allocated portion of physical link resources.

16. The resource allocation apparatus of claim 15 wherein the portion of physical link resources is determined and allocated further according to a flow based resource assignment algorithm, or a group flow based resource assignment algorithm.

17. The resource allocation apparatus of claim 16 wherein determining and allocating the portion of physical link resources according to the flow based resource assignment algorithm comprises:
determining the one or more flows of the service managed by the first network slice from the instructions;
performing the flow based resource assignment algorithm to determine physical link resource requirements for each of the one or more flows; and
allocating the portion of physical link resources associated with the first network slice according to the determined physical link resource requirements for each of the one or more flows.

18. The resource allocation apparatus of claim 16 wherein determining and allocating the portion of physical link resources according to the group flow based resource assignment algorithm comprises:
determining the one or more flows of the service managed by the first network slice from the instructions;
determining groups of flow segments from the one or more flows;
performing the group flow based resource assignment algorithm according to the determined groups of flow segments; and
allocating the portion of physical link resources associated with the first network slice according to the results of the group flow based resource assignment algorithm.

19. The resource allocation apparatus of claim 16 wherein when the service comprises a service function chain, the step of allocating the portion of physical link resources further comprises determining flow segments according to the service function chain.

20. The resource allocation apparatus of claim 18 wherein each group of flow segments comprises one or more flow segments having a common starting node, a common ending node, or common starting and ending nodes.

21. The resource allocation apparatus of claim 18 wherein the groups of flow segments are determined for each network slice of the plurality of network slices.

22. The resource allocation apparatus of claim 18 wherein the group flow based resource assignment algorithm comprises a set of flow group conservation constraints.

23. The resource allocation apparatus of claim 22 wherein the set of flow group conservation constraints comprises:

$$\sum_{a \in A_{in}(n)} x_a^k - \sum_{a \in A_{out}(n)} x_a^k = \begin{cases} 0, & n \notin S^k, n \notin D^k \\ -d_S^k(n), & n \in S^k \\ d_D^k(n), & n \in D^k \end{cases}$$

wherein n is a node in the communications network, k is a group of flow segments, a is a link in the communications network, $x_a^k$ is a physical resource allocation for group k on link a, $d_S^k(n)$ is the total demand at a given source node n due to the group of flow segments k, $d_D^k(n)$ is the total demand at a given destination node n due to the group of flow segments k, $S^k$ is a set of source nodes for the group of flow segments k, and $D^k$ is a set of destination nodes for the group of flow segments k.

24. The resource allocation apparatus of claim 18 wherein the group flow based resource assignment algorithm comprises a set of link capacity constraints.

25. The resource allocation apparatus of claim 24 wherein the set of link capacity constraints comprises:

$$\sum_{k=1}^{K} x_a^k \leq c_a$$

wherein k is a group of flow segments, a is a link in the communications network, $X_a^k$ is a physical resource allocation for group k on link a, and $C_a$ is a capacity of link a.

26. The resource allocation apparatus of claim 15 wherein the output interface further informs nodes of the communications network the portion of physical link resources allocated to each network slice.

27. A method for performing traffic engineering in a communications network having a plurality of network slices, each network slice of the plurality of network slices configured to manage a service for transmitting data along one or more flows traversing nodes of the communications network, the method comprising, by a traffic engineering entity of a first network slice:
    receiving, from a resource allocator separate from the traffic engineering entity, an indication of an allocated portion of physical link resources of the communications network, and
    managing transmission or receipt of data associated with a first service according to the first network slice using the allocated portion of physical link resources, wherein said managing transmission or receipt of data comprises providing routing decisions for traffic flows of the first service.

28. The method of claim 27 wherein the method additionally comprises:
    receiving information comprising one or more of: flow information for each of the flows of the first network slice, and forwarding graph information; and
    providing routing decisions for flows managed by the first network slice based on the received information and the allocated portion of physical link resources.

29. The method of claim 27 wherein each network slice of the plurality of network slices comprises a separate traffic engineering entity for performing traffic engineering functions for flows associated with the respective network slices.

30. A traffic engineering entity in a communications network having a plurality of network slices, each network slice of the plurality of network slices configured to manage a service for transmitting data along one or more flows traversing nodes of the communications network, the traffic engineering entity comprising:
    a processor;
    an input interface coupled to the processor for receiving, from a resource allocator separate from the traffic engineering entity, an indication of an allocated portion of physical link resources of the communications network;
    an output interface coupled to the processor for transmitting instructions to network nodes operative in support of a first network slice of the plurality of network slices; and
    a memory coupled to the processor and having stored thereon statements and instructions that when executed by the processor cause the traffic engineering entity to manage transmission or receipt of data associated with a first service according to the first network slice using the allocated portion of physical link resources, wherein said managing transmission or receipt of data comprises providing routing decisions for traffic flows of the first service.

31. The traffic engineering entity of claim 30, further configured to:
    receive information comprising one or more of: flow information for each of the flows of the first network slice, and forwarding graph information; and
    provide routing decisions for flows managed by the first network slice based on the received information and the allocated portion of physical link resources.

32. The traffic engineering entity of claim 30, wherein each network slice of the plurality of network slices comprises a separate traffic engineering entity for performing traffic engineering functions for flows associated with the respective network slices.

33. A non-transitory memory having recorded thereon statements and instructions for execution by a processor, the statements and instructions comprising: determining a required portion of physical link resources of a communications network for each network slice of a plurality of network slices; allocating the required portion of physical link resources to each of the network slices, wherein each network slice is configured to transmit data along one or more associated flows over the communications network using its allocated portion of physical link resources; and directing transmission of an indication of the required portion of physical network resources to a traffic engineering controller functionally separate from a resource allocation entity operated according to the statements and instructions.

* * * * *